(12) United States Patent
Emani

(10) Patent No.: US 10,698,392 B2
(45) Date of Patent: Jun. 30, 2020

(54) USING GRAPHICS PROCESSING UNIT FOR SUBSTRATE ROUTING AND THROUGHPUT MODELING

(71) Applicant: Applied Materials, Inc., Santa Clara, CA (US)

(72) Inventor: Shyam Sunder Emani, Cupertino, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 56 days.

(21) Appl. No.: 16/015,302

(22) Filed: Jun. 22, 2018

(65) Prior Publication Data

US 2019/0391569 A1 Dec. 26, 2019

(51) Int. Cl.
  *G05B 19/41* (2006.01)
  *G05B 19/418* (2006.01)
  *G06T 1/20* (2006.01)

(52) U.S. Cl.
  CPC .......... *G05B 19/41865* (2013.01); *G06T 1/20* (2013.01); *G05B 2219/34417* (2013.01); *G05B 2219/35499* (2013.01); *G05B 2219/45031* (2013.01)

(58) Field of Classification Search
  None
  See application file for complete search history.

(56) References Cited

U.S. PATENT DOCUMENTS

| | | | | |
|---|---|---|---|---|
| 8,396,582 B2* | 3/2013 | Kaushal | ............. | G05B 13/0265 700/104 |
| 2007/0179652 A1* | 8/2007 | Weigang | .......... | G05B 19/41865 700/100 |
| 2008/0216077 A1* | 9/2008 | Emani | ............. | G05B 19/41865 718/102 |
| 2015/0081263 A1* | 3/2015 | Nagahara | ............... | G06Q 50/04 703/7 |
| 2018/0307533 A1* | 10/2018 | Tian | ....................... | G06F 9/4887 |

FOREIGN PATENT DOCUMENTS

| WO | 2015/112335 A1 | 7/2015 |
|---|---|---|
| WO | 2016/190905 A1 | 12/2016 |

OTHER PUBLICATIONS

International Search Report and Written Opinion dated Sep. 10, 2019, on application No. PCT/US2019/038586.

* cited by examiner

*Primary Examiner* — Jason Lin
(74) *Attorney, Agent, or Firm* — Lowenstein Sandler LLP

(57) ABSTRACT

Methods, systems, and non-transitory computer readable medium for scheduling a substrate processing sequence in an integrated substrate processing system are disclosed herein. A processing device generates a processing model for a batch of semiconductor substrates. The processing model defines a corresponding start time for each semiconductor substrate in each processing chamber in the integrated substrate processing system. One or more graphics processing units (GPUs) generates parallel inputs based on the processing model and concurrently processes, by a plurality of cores of the one or more GPUs, the parallel inputs to generate parallel outputs for the batch of semiconductor substrates. Each of the parallel inputs is processed on a distinct core of the plurality of cores of the one or more GPUs to generate a corresponding parallel output. The processing device causes the batch of semiconductor substrates to be processed in the integrated substrate processing system based on the parallel outputs.

20 Claims, 5 Drawing Sheets

USING GRAPHICS PROCESSING UNIT FOR SUBSTRATE ROUTING AND THROUGHPUT MODELING

TECHNICAL FIELD

The present disclosure relates to transferring substrates in an integrated processing system, and, more particularly, using a graphics processing unit (GPU) to improve substrate routing and throughput modeling in the integrated processing system.

BACKGROUND

In semiconductor processing, multi-layered features are fabricated on semiconductor substrates using specific processing recipes having many processing acts. A cluster tool, which integrates a number of process chambers to perform a process sequence without removing substrates from a processing environment (e.g., a controlled environment), is generally used in processing semiconductor substrates. A process sequence is generally defined as the sequence of device fabrication acts, or process recipe acts, completed in one or more processing chambers in a cluster tool. A process sequence may generally contain various substrate processing acts (e.g., for electronic device fabrication).

Cluster tools may include a sequencer that is responsible for moving substrates to different positions, and running processes on the substrates based on the user input. The sequencer is configured to improve substrate movements so that a greater throughput can be achieved. While transferring the substrates in the cluster tool, the sequencer also makes sure that all constraints specified by the process engineers or users are satisfied. Conventional approaches are heuristic, i.e., each product is written with custom software code that handles topologies and the most common statistics that the cluster tool can find itself in. It is time consuming to write this code for new products, and also take a long time to stabilize.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method may include generating a processing model for a batch of semiconductor substrates. The processing model may define a corresponding start time for each semiconductor substrate in each processing chamber in the integrated substrate processing system. The method may further include generating parallel inputs based on the processing model. The method may further include concurrently processing, by a plurality of cores of one or more GPUs, the parallel inputs to generate parallel outputs for the batch of semiconductor substrates. Each of the parallel inputs is processed on a distinct core of the plurality of cores of the one or more GPUs to generate a corresponding parallel output. The method may further include causing the batch of semiconductor substrates to be processed in the integrated substrate processing system based on the parallel outputs.

BRIEF DESCRIPTION OF THE DRAWINGS

The present disclosure is illustrated by way of example, and not by way of limitation in the figures of the accompanying drawings.

DETAILED DESCRIPTION

Figure 1:
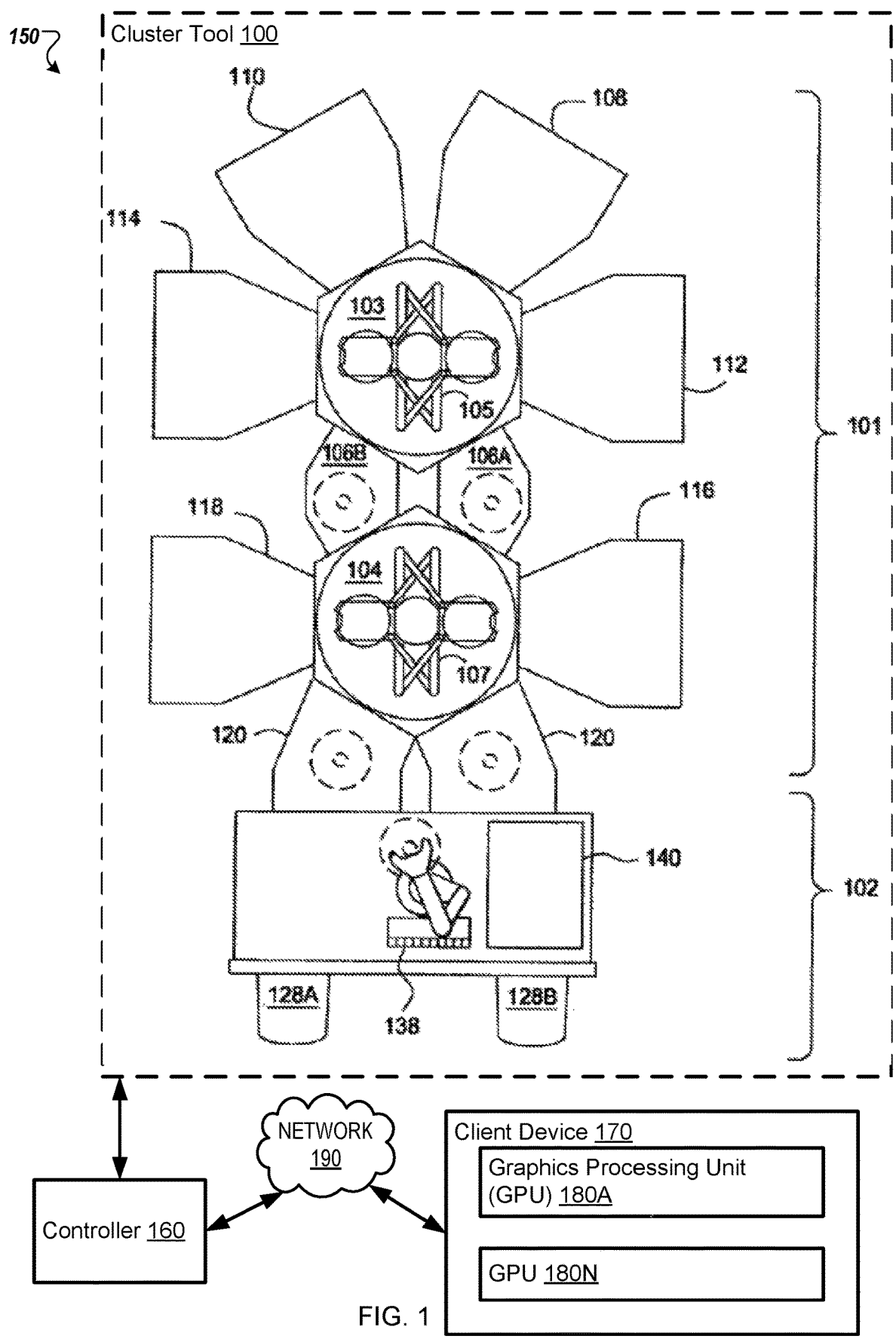
FIG. 1 illustrates a computing environment, according to certain embodiments.

Described herein are technologies directed to substrate routing and predicting throughput (e.g., of substrates in a cluster tool). New substrate processing sequences for substrate routing are often received (e.g., a different substrate processing sequence for each substrate order). Substrate processing sequences may be updated. Substrate processing sequences are to be reactive to failures (e.g., re-route substrates responsive to a failure in part of the cluster tool). The complexity of substrate processing sequences may increase as the number of processing chambers increase. Substrate processing may have a strict timing control, so each event that could happen during substrate processing is to be accounted for. Events may include one or more of robot schedules, preventative maintenance tasks, dummy wafer movements, cleaning, complex sequences, or multiple visits by the same substrate to the same chamber. Substrate processing may have limits for queue time (e.g., the amount of time substrates wait in a processing chamber after a process is complete). Queue time may increase if the next processing chamber is not available or if the robot is moving other materials.

Software code for substrate routing and/or predicting throughput of the substrates may be written. Writing software code for substrate routing and/or predicting throughput may be time consuming, may take a long time to stabilize, and may not account for events and failures that could occur (e.g., may be inaccurate).

The devices, systems, and methods, as disclosed herein provide use of one or more GPUs for substrate routing and throughput modeling. Substrate routing (e.g., with complex sequencing requirements) and throughput may be modeled using a processing model. The processing model may account for one or more of events, failures, queue time limits, etc. Parallel inputs may be generated based on the processing model and cores of the one or more GPUs may concurrently process the parallel inputs to generate parallel outputs. The parallel outputs may indicate values (e.g., start times for different processes at different processing chambers, etc.) to minimize processing duration. The substrates may be processed and substrate throughput may be predicted based on the parallel outputs. Responsive to detecting a fault, an updated processing model may be generated based on the fault, updated parallel inputs may be generated, and the updated parallel inputs may be processed by the cores of the one or more GPUs to generate updated parallel outputs for causing the substrates to be re-routed or for re-predicting the throughput.

Using one or more GPUs for substrate routing and throughput modeling provides technological advantages. The technical advantages include finding solutions to new processing sequences (e.g., a new substrate order, updates to a processing sequence, etc.) by generating a processing model and solving the processing model within a short amount of time (e.g., in real-time, in a few seconds, etc.). The technical advantages also include being reactive to failures by detecting a fault, updating the processing model based on the fault, and solving the updated processing model within a short amount of time. The technical advantages also include generating timetables for substrate processing and updating the timetables responsive to failures, where the timetables meet the queue time limits.

Aspects of the present disclosure result in technological advantages of significant reduction in energy consumption, bandwidth, processing duration, and so forth. Aspects of the present disclosure decrease wait time during substrate processing which reduces overall energy consumption. A client device generating the processing model, solving the processing model using the one or more GPUs of the client device, generating a timetable based on the solved processing model, and transmitting the timetable uses less bandwidth than a client device transmitting one or more of the processing model, parallel inputs based on the processing model, or the solved processing model to other components over a network.

FIG. 1 illustrates a computing environment 150, according to certain embodiments. The computing environment 150 includes a controller 160 and a client device 170. The client device 170 may include one or more GPUs 180. Each GPU 180 may include multiple cores (e.g., hundreds of cores) that may concurrently process parallel inputs to generate parallel outputs. The controller 160 communicates with client device 170 over network 190. The computing environment 150 may include a cluster tool 100. The cluster tool 100 may be used for substrate processing. The methods described herein may be used with other tools configured to perform a process sequence. In one example, the cluster tool 100 of FIG. 1 may be the Endura® cluster tool commercially available from Applied Materials, Inc. in Santa Clara, Calif.

The client device 170 may receive a sequence recipe (e.g., via user input) that describes possible processing chambers a substrate is to visit at different stages and a corresponding process to be run in each processing chamber. The client device 170 may generate a processing model, generate parallel inputs based on the processing model, and concurrently process the parallel inputs by the cores of the one or more GPUs 180 to generate parallel outputs. The client device 170 may generate a process schedule (e.g., a schedule for the substrate movements so that substrates can be processed in a shorter duration) for a batch of substrates to be processed in cluster tool 100 based on the parallel outputs. For example, the client device 170 creates a mathematical model of the cluster tool 100, and then optimizes the model to provide a solution for an improved way of transferring substrates within the cluster tool 100, as well as satisfy the defined constraints of the cluster tool 100.

In some embodiments, client device may predict throughput of the cluster tool 100 based on the timetable (e.g., without being coupled to the client tool 100). In some embodiments, client device 170 may transfer a substrate processing schedule (e.g., timetable) and instructions to the controller 160. The controller 160 may cause the batch of semiconductor substrates to be processed by the cluster tool 100 based on the substrate processing schedule and instructions. Responsive to updates to the sequence recipe, failures in the cluster tool 100, etc., the client device 170 may generate an updated processing schedule and instructions.

The cluster tool 100 includes a vacuum-tight processing platform 101 and a factory interface 102. The platform 101 comprises a plurality of processing chambers 110, 108, 114, 112, 118, 116, and at least one load-lock chamber 120, which are coupled to vacuum substrate transfer chambers 103, 104. The factory interface 102 is coupled to transfer chamber 104 by the load-lock chamber 120.

In one embodiment, the factory interface 102 comprises at least one docking station, at least one substrate transfer robot 138, and at least one substrate aligner 140. The docking station is configured to accept one or more front opening unified pods 128 (FOUP). Two FOUPs 128A, 128B are shown in the embodiment of FIG. 1. The substrate transfer robot 138 is configured to transfer the substrate from the factory interface 102 to the load-lock chamber 120.

The load-lock chamber 120 has a first port coupled to the factory interface 102 and a second port coupled to a first transfer chamber 104. The load-lock chamber 120 is coupled to a pressure control system which pumps down and vents the chamber 120 as needed to facilitate passing the substrate between the vacuum environment of the transfer chamber 104 and the substantially ambient (e.g., atmospheric) environment of the factory interface 102.

The first transfer chamber 104 and the second transfer chamber 103 respectively have a first robot 107 and a second robot 105 disposed therein. Two substrate transfer platforms 106A, 106B are disposed in the transfer chamber 104 to facilitate transfer of the substrate between robots 105, 107. The platforms 106A, 106B can either be open to the transfer chambers 103, 104 or be selectively isolated (i.e., sealed) from the transfer chambers 103, 104 to allow different operational pressures to be maintained in each of the transfer chambers 103, 104.

The robot 107 disposed in the first transfer chamber 104 is capable of transferring substrates between the load-lock chamber 120, the processing chambers 116, 118, and the substrate transfer platforms 106A, 106B. The robot 105 disposed in the second transfer chamber 103 is capable of transferring substrates between the substrate transfer platforms 106A, 106B and the processing chambers 112, 114, 110, 108.

The client device 170 may generate a schedule (e.g., timetable) based on a list of substrates, a corresponding processing sequence for each substrate of the list, and a corresponding processing chamber (e.g., processing chambers 112, 114, 110, 108) for each process in the corresponding sequence for each substrate in the list.

Figure 2:
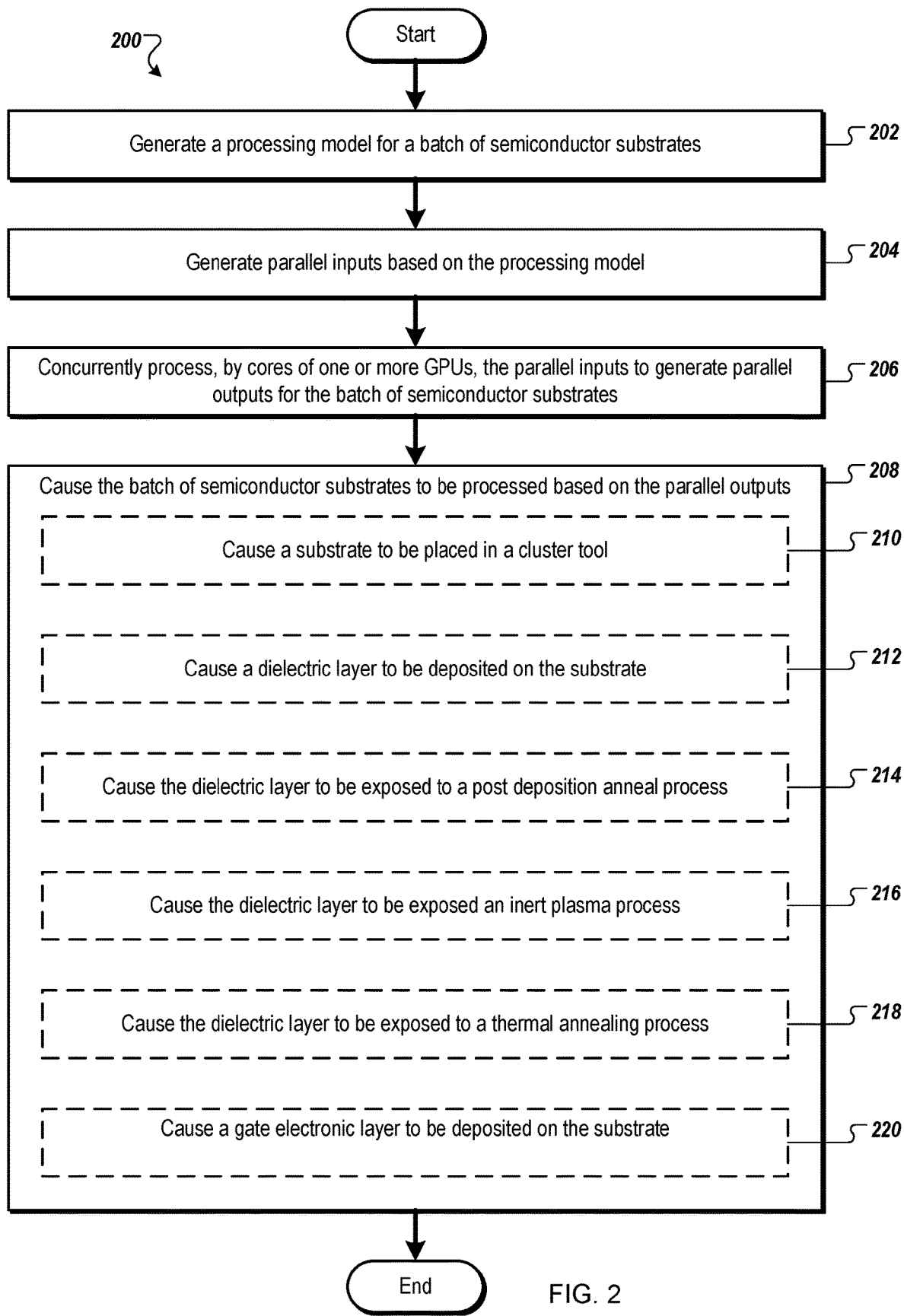
FIG. 2 is a flow diagram of a method for causing semiconductor substrates to be processed based on parallel outputs, according to certain embodiments.
Figure 3:
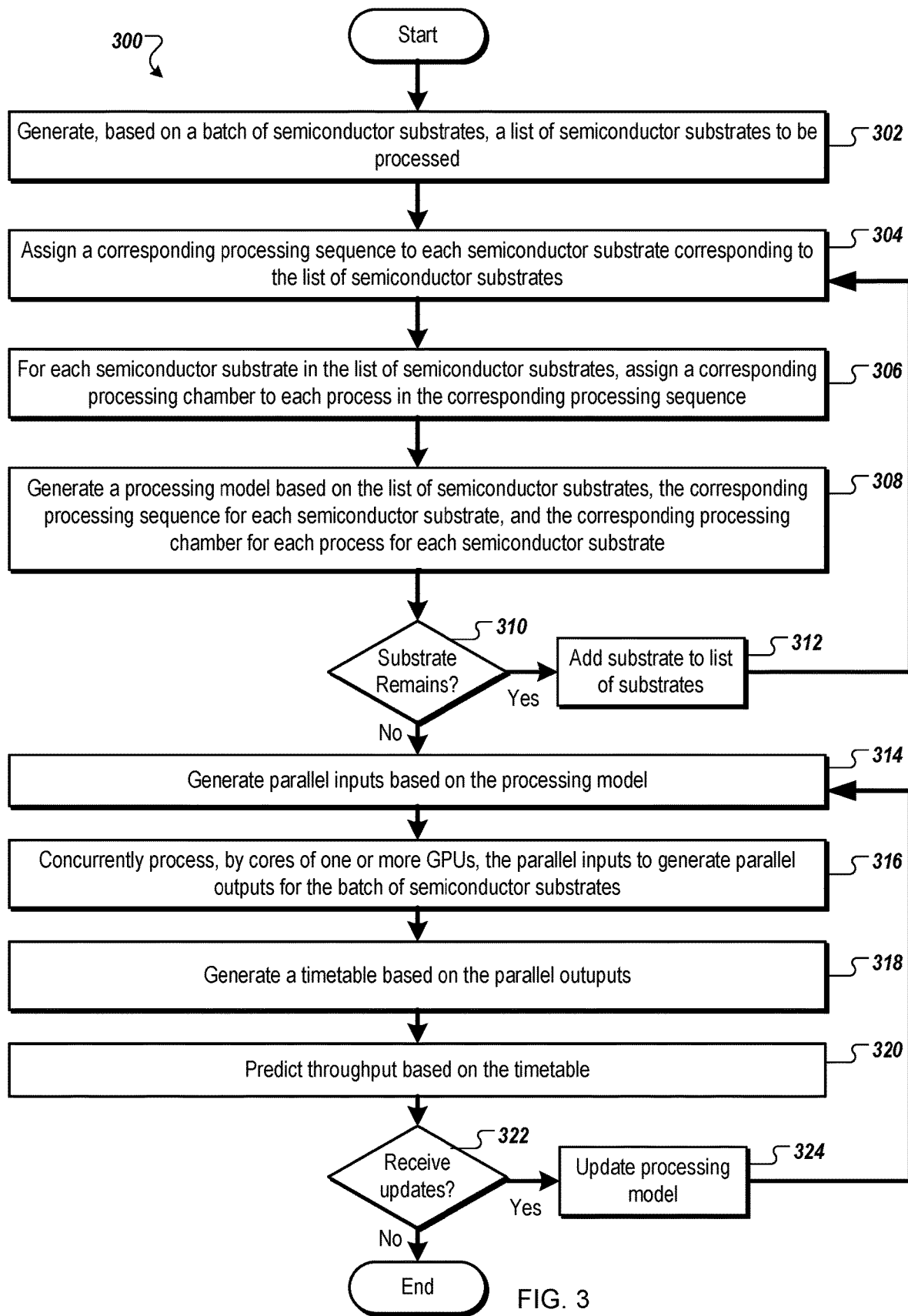
FIG. 3 is a flow diagram of a method for predicting throughput of semiconductor substrates based on a timetable, according to certain embodiments.
Figure 4:
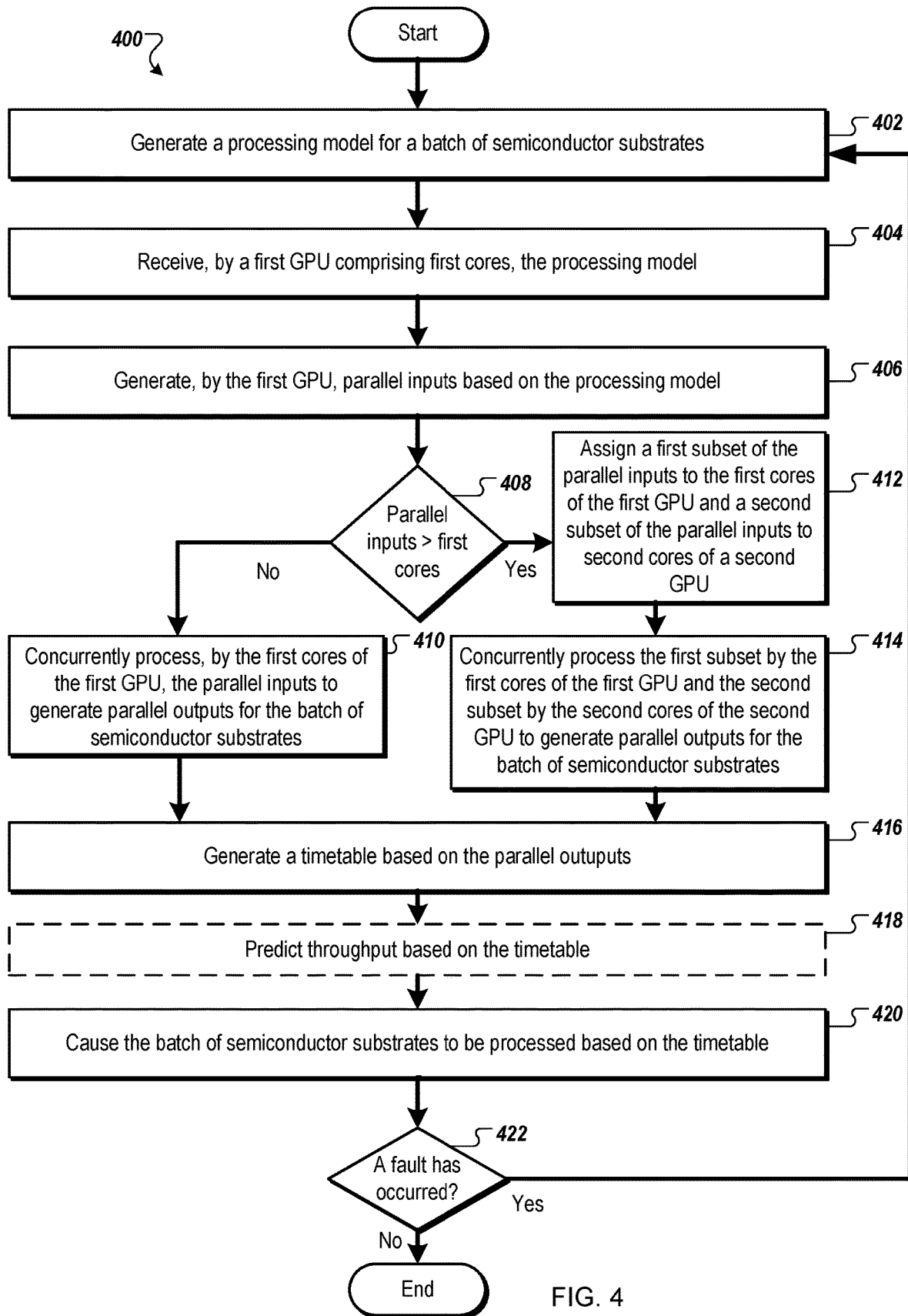
FIG. 4 is a flow diagram of a method for processing parallel inputs by one or more GPUs, according to certain embodiments.

FIGS. 2-4 are flow diagrams of methods 200, 300, and 400 of using one or more GPUs to process parallel inputs by one or more GPUs (e.g., for substrate routing and/or predicting throughput), according to certain embodiments. Methods 200, 300, and 400 may be performed by processing logic that may include hardware (e.g., circuitry, dedicated logic, programmable logic, microcode, etc.), software (such as instructions run on a processing device, one or more GPUs, a general purpose computer system, or a dedicated machine), firmware, microcode, or a combination thereof. In one embodiment, methods 200, 300, and 400 may be performed, in part, by client device 170. In some embodiments, a non-transitory storage medium stores instructions that when executed by a client device 170 (e.g., at least one of a processing device or one or more GPUs of client device 170) cause the client device 170 (e.g., the at least one of a processing device or one or more GPUs) to perform methods 200, 300, and 400.

For simplicity of explanation, methods 200, 300, and 400 are depicted and described as a series of acts. However, acts in accordance with this disclosure can occur in various orders and/or concurrently and with other acts not presented and described herein. Furthermore, not all illustrated acts may be performed to implement the methods 200, 300, and 400 in accordance with the disclosed subject matter. In addition, those skilled in the art will understand and appreciate that the methods 200, 300, and 400 could alternatively be represented as a series of interrelated states via a state diagram or events.

FIG. 2 is a flow diagram of a method 200 for causing semiconductor substrates to be processed based on parallel outputs, according to certain embodiments.

Referring to FIG. 2, at block 202 the client device 170 generates (e.g., by a processing device of the client device 170) a processing model for a batch of semiconductor substrates.

To generate the processing model, the client device 170 may define a sequence for each substrate in a batch of substrates. In one embodiment, client device 170 receives the sequence for each substrate from the user. For example, the user may define a processing sequence as: entry, deposition, anneal, etch, anneal, deposition, exit. Mathematically, the first batch of substrates may be defined as $\{W_i\}$ where i ranges from 1 to n. In some embodiments, each substrate $W_i$ may undergo the same sequence of acts. The acts in the sequence may be represented mathematically as $\{s_i\}$ where i ranges from 1 to n. Thus, each substrate $W_i$ may undergo each act $s_i$ in the sequence defined by client device 170.

To generate the processing model, the client device 170 may assign a processing chamber to each substrate for each act in the processing sequence. For example, referring to FIG. 1, suitable chambers may be chosen from chambers 108, 110, 112, 114, 116, and 118 to facilitate the process sequence for each substrate in the batch of substrates. In a specific example, the chambers 116, 118 may be a chemical vapor deposition (CVD) chamber; the chambers 108, 114 may be a decoupled plasma nitridation (DPN) chamber; the chambers 110, 112 may be a rapid thermal process (RTP) chamber. One or more cool down chambers may be positioned above the substrate transfer platform 106A, 106B. Accordingly, upon determining the arrangement in the cluster tool 100, client device 170 may allocate chambers, load locks, and robots for each process act in the processing sequence and transitions between acts.

Client device 170 may generate the processing model based off the assignment of processing chambers. Generally, each substrate, $W_x$ starts at a time, $T_x$. The process duration of each sequence act, $s_i$ is defined as $D_s$ where s is the act number of the sequence. For example, $D_3$ is the process time of sequence act $s_3$. Generally, a substrate may wait in the process chamber after the process in that process chamber has finished. The wait time is defined as $Q_{xs}$, where x is the substrate number and s is the sequence act number. For example, $Q_{21}$ is interpreted as the wait time of substrate $W_2$ at sequence act $s_1$. Given the preceding definitions, substrate $W_1$ starts act $s_1$ at a time equal to $T_x+D_1+Q_{11}$. Generalizing, substrate $W_1$ will start any act $s_i$ at a time equal to:

$$T_x + \sum_{j=1}^{s-1} D_j + \sum_{j=1}^{s-1} Q_{1j}$$

Block 202 may further include, for each processing chamber in the cluster tool 100, the client device 170 defining a sequence constraint. The sequence constraints aid in the objective of decreasing, or ultimately minimizing, the time taken to process all of the substrates in the batch of substrates. This would mean that the controller 160 would send the substrates into the cluster tool 100 as quickly as possible, and retrieve the substrates from the cluster tool 100. To do so, the client device 170 leverages the principle of linear optimization for generating the process model.

Linear optimization is a method of achieving the "best" outcome (e.g., shortest process time) in a mathematical model (e.g., matrix) whose requirements are represented by linear relationships. Mathematically, this may be represented as:

Minimize:

$$\sum_{i=1}^{n} C_1 X_1$$

Subject to:

$$A_{11}X_1+A_{12}X_2+A_{13}X_3+ \ldots \le B_1$$

$$A_{21}X_1+A_{22}X_2+A_{23}X_3+ \ldots \le B_2$$

$$\ldots$$

$$A_{m1}X_1+A_{m2}X_2+A_{m3}X_3+ \ldots \le B_m$$

where $X_i$ are variables, $\{A_{mn}\} \in \mathbb{Q}$, $\{B_i\} \in \mathbb{Q}$, and $\{C_i\} \in \mathbb{Q}$.

Applying this principle to the above, the client device 170 minimizes:

$$\sum_{i=i}^{n} A_i T_i + \sum_{j=1}^{N} \sum_{k=1}^{m} B_j Q_{jk}$$

where $A_i$, $B_j$ are weights that may be applied to the start time variables $T_i$ and the wait times $Q_{jk}$, respectively. For example, the weights may be directed to additional features of the semiconductor manufacturing process. In one embodiment, the weights may be adjusted responsive to a cleaning process to be run after a substrate is finished processing in a processing chamber. In another embodiment, the weights may be adjusted responsive to "dummy" substrate movement throughout the cluster tool 100. In another embodiment, the weights may be adjusted responsive to whether the robot is a single blade robot or a dual blade robot. In another embodiment, the weights may be adjusted responsive to a processing chamber being a batch processing chamber, i.e., the processing chamber is capable of processing two or more substrates at once. In yet another embodiment, the weights may be adjusted responsive to a substrate processing sequence requiring the substrate to revisit a certain processing chamber.

Generally, the constraints may be defined as a given substrate cannot enter a given processing chamber until the previous substrate has completed processing. Mathematically, assume there are two substrates, $W_x$, $W_y$, that use the same processing chamber at sequence act $s_s$. $W_x$ arrives at the chamber before $W_y$. Accordingly, the start time for $W_y$ is greater than the start time of $W_x$+Duration of act $s_s$+$W_x$ wait time after act $s_s$. Using the definition of start time, the constraint may be represented as:

$$T_x + \sum_{j=1}^{s-1} D_j + \sum_{j=1}^{s-1} Q_{xj} + D_s + Q_{xs} \leq T_y + \sum_{j=1}^{s-1} D_j + \sum_{j=1}^{s-1} Q_{yj}$$

The constraint can be solved to optimize substrate routing (e.g., to solve one or more problems related to substrate routing). For example, $\sum_{t=i}^{n} T_t + \sum_{j=1}^{N} \sum_{k=1}^{m} Q_{jk}$ may be minimized subject to $T_x + \sum_{j=1}^{s-1} D_j + \sum_{j=1}^{s-1} Q_{xj} + D_s + Q_{xs} \leq T_y + \sum_{j=1}^{s-1} D_j + \sum_{j=1}^{s-1} Q_{yj}$ for each processing chamber that is used in the sequence act and every consecutive substrate pair, i.e. for each (x,y), where $W_x$, $W_y$ use the same processing chamber at sequence act $s_s$ consecutively. In another example, the constraint may be solved to minimize movements of a robot. In another example, the constraint may be solved to minimize idle time of a chamber. In another example, the constraint may be solved, responsive to a chamber faulting and the system not being able to continue to process all of the substrates, to determine the minimum number of substrates that can be sent back to the FOUPs so that the rest of the substrates can be processed without stopping production. In some embodiments, the constraint may be solved to predict throughput of substrates.

The client device 170 may generate the processing model for all substrates in the batch based on all the sequence constraints simultaneously. In some embodiments, the client device 170 may generate the processing model at once responsive to each substrate being assigned the same processing sequence.

At block 204, client device 170 generates (e.g., by a first GPU 180A of the one or more GPUs 180 of the client device 170) parallel inputs based on the processing model. For example, the processing model may be a matrix and the generating of the parallel inputs may include generating matrices based on the matrix.

One or more values in the matrix may correspond to a variable. For example, one or more values may correspond to the variable of number of substrates. Some variables may have requirements for the corresponding values. For example, the variable of number of substrates may have a requirement that the corresponding values are to be an integer. The client device 170 may generate additional matrices for all values that do not meet the requirements of the corresponding variable. For example, the client device 170 may identify, in the matrix, a non-integer value corresponding to a variable that is to be an integer (e.g., number of substrates). The client device 170 may generate a first matrix of the plurality of matrices by replacing the non-integer value (e.g., 3.5) with a first integer (e.g., 4) that is greater than the non-integer value. The client device 170 may generate a second matrix of the plurality of matrices by replacing the non-integer value (e.g., 3.5) with a second integer (e.g., 3) that is less than the non-integer value. The client device 170 may generate the parallel inputs via a GPU 180 of the client device 170. The first matrix and the second matrix may be supersets of the matrix, where the supersets include the additional restriction of replacing the non integer value with an integer (e.g., 4 in the first matrix and 3 in the second matrix).

At block 206, client device 170 concurrently processes, by cores of one or more GPUs 180, the parallel inputs to generate parallel outputs for the batch of semiconductor substrates. Each of the parallel inputs (e.g., a corresponding matrix of the plurality of matrices) may be processed on a distinct core of the plurality of cores of the one or more GPUs 180 to generate a corresponding parallel output. Each of the cores may solve the corresponding matrix to generate, for each of the matrices, a corresponding set of values for processing of the batch of semiconductor substrates. The client device 170 may select (e.g., via GPU 180) the set of values that corresponds to a minimum processing duration for the processing of the batch of semiconductor substrates.

In some embodiments, the client device 170 may predict (e.g., by a processing device of the client device 170) throughput (of the integrated substrate processing system, of cluster tool 100) based on the parallel outputs. Responsive to predicting throughput (and causing the predicted throughput to be displayed), the client device 170 may receive updates (e.g., via user input) to the processing model based on the predicted throughput and flow may return to block 202. Responsive to not receiving further updates to the processing model, flow may continue to block 208.

At block 208, client device 170 causes (e.g., by a processing device of the client device 170) the semiconductor substrates to be processed based on the parallel outputs (e.g., the selected set of values that corresponds to a minimum processing duration). In some embodiments, the client device 170 generates a timetable for the substrates based on the parallel outputs (e.g., the timetable includes the start time $T_x$ of each substrate, and the order of substrate processing at each processing chamber). The client device 170 may optionally transmit the timetable to the controller 160. In those embodiments in which the client device 170 and the controller 160 are one in the same, client device 170 does not need to transmit the timetable.

At block 208, the client device 170 may cause the batch of semiconductor substrates to be processed according to a process sequence for deposition of electric layers on a substrate in an integrated cluster tool, such as cluster tool 100 in FIG. 1. Block 208 may include one or more of blocks 210-220. At block 210, the client device 170 may cause a substrate to be placed in cluster tool 100.

At block 212, the client device 170 may cause a dielectric layer to be deposited on the substrate. The dielectric layer may be a metal oxide, and may be deposited by an ALD process, an MOCVD process, a conventional CVD process, or a PVD process.

At block 214, the client device may cause (e.g., subsequent to the deposition process) the substrate to be exposed to a post deposition anneal (PDA) process. The PDA process may be performed in a rapid annealing chamber, such as the Radiance® RTP chamber, commercially available from Applied Materials, Inc. in Santa Clara, Calif.

At block 216, the client device 170 may cause the dielectric layer to be exposed to an inert plasma process to densify the dielectric material to form a plasma-treated layer. The inert plasma process may include a decoupled inert gas plasma process performed by flowing an inert gas into a decoupled plasma nitridation (DPN) chamber.

At block 218, the client device 170 may cause the plasma-treated layer disposed on the substrate to be exposed to a thermal annealing process.

At block 220, the client device 170 may cause a gate electrode layer to be deposited over the annealed dielectric layer. The gate electrode layer may be a polycrystalline-Si, amorphous-Si, or other suitable material, deposited, for example, using an LPCVD chamber.

Referring back to FIG. 1, cluster tool 100 may be in communication with a controller 160. The controller 160 may be a controller that aids in controlling the process parameters of each substrate processing chamber 108, 110, 112, 114, 116, and 118 in cluster tool 100. Additionally, the controller 160 may aid in the sequencing and scheduling of the substrates to be processed in the cluster tool 100. At block 208, client device 170 may cause the controller 160 to control the processing parameters of cluster tool 100 to cause the semiconductor substrates to be processed based on the parallel outputs.

FIG. 3 is a flow diagram of a method 300 for predicting throughput of semiconductor substrates based on a timetable, according to certain embodiments. The method 300 may cause semiconductor substrates to be processed in the cluster tool 100 of FIG. 1. In other examples, the method 300 may cause semiconductor substrates to be processed on other cluster tools. In some embodiments, not all substrates $W_i$ undergo the same sequence of acts.

Referring to FIG. 3, at block 302, client device 170 generates, (e.g., by a processing device of the client device 170) based on a batch of semiconductor substrates, a list of semiconductor substrates to be processed. For example, two substrates (e.g., $W_x$, $W_y$) may be chosen to enter the processing chamber of the cluster tool 100.

At block 304, client device 170 assigns (e.g., by a processing device of the client device 170) a corresponding processing sequence to each semiconductor substrate corresponding to the list of semiconductor substrates. A sequence for each substrate chosen to enter the cluster tool 100 may be defined. In one embodiment, client device 170 receives the sequence for each substrate from the user. For example, the user may define a processing sequence as: entry, deposition, anneal, etch, anneal, deposition, exit. The acts in the sequence may be represented mathematically as $\{s_i\}$ where i ranges from 1 to n. Thus, $W_x$ includes the set of acts $\{s_i\}$, and $W_y$ includes the set of acts $\{s_j\}$ such that an element of $\{s_i\}$ is not equal to an element of $\{s_j\}$.

At block 306, client device 170, for each semiconductor substrate in the list of semiconductor substrates, assigns (e.g., by a processing device of the client device 170) a corresponding processing chamber to each process in the corresponding processing sequence. For example, referring to FIG. 1, suitable chambers may be chosen from chambers 108, 110, 112, 114, 116, and 118 to facilitate the process sequence defined above at block 402. In a specific example, the chambers 116, 118 may be a chemical vapor deposition (CVD) chamber; the chambers 108, 114 may be a decoupled plasma nitridation (DPN) chamber; the chambers 110, 112 may be a rapid thermal process (RTP) chamber. One or more cool down chambers may be positioned above the substrate transfer platform 106A, 106B. Accordingly, for $W_x$, client device 170 assigns a processing chamber to each act in the set $\{s_i\}$, and for $W_y$, client device 170 assigns a processing chamber to each act in the set $\{s_j\}$. Thus, upon determining the arrangement in the cluster tool 100, client device 170 may allocate chambers, load locks, and robots for each process act in the processing sequence and transitions between acts for $W_x$, $W_y$.

At block 308, client device 170 generates (e.g., by a processing device of the client device 170) a processing model based on the list of semiconductor substrates (e.g., all substrates selected to enter the cluster tool 100), the corresponding processing sequence for each semiconductor substrate, and the corresponding processing chamber (e.g., processing chamber assignment) for each process for each semiconductor substrate. For example, client device 170 generates a model based on the processing chamber assignment for substrates $W_x$, $W_y$. In some embodiments, block 308 may include, for each processing chamber in the cluster tool 100, the client device 170 defining a sequence constraint. The sequence constraints may aid in the objective of decreasing, or ultimately minimizing, the time taken to process all of the substrates in the batch of substrates. Intuitively, this would mean that the controller 160 would send the substrates into the cluster tool 100 as quickly as possible, and retrieve the substrates from the cluster tool 100. To do so, the client device 170 leverages the principle of linear optimization for generating the process model.

For example, client device 170 may generate a sequence constraint for each processing chamber in the cluster tool 100 that substrates $W_x$, $W_y$ will travel to during their processing sequences. Client device 170 may generate the sequence constraints in accordance with the methods discussed above.

In some embodiments, the sequence for each substrate in the batch of substrates may not be the same. Accordingly, the client device 170 may generate the timetable for processing piecewise, by starting with two substrates (i.e., $W_x$, $W_y$) and adding an additional substrate (e.g., $W_z$) until all substrates in the batch are added.

At block 310, the client device 170 (e.g., by a processing device of the client device 170) determines whether there are any substrates remaining in the batch of substrates to be analyzed. If there are substrates remaining in the batch of substrates to be analyzed, flow proceeds to block 312. If, however, at block 310, the client device 170 determines that there are no substrates in the batch of substrates remaining, then flow proceeds to block 314.

At block 312, the client device 170 adds (e.g., by a processing device of the client device 170) a substrate (e.g., $W_z$) to the list of substrates to be processed, i.e., client device 170 adds $W_z$ to the substrates $W_x$, $W_y$ to be processed. The method 300 then reverts to block 304, for analysis with substrates $W_x$, $W_y$, $W_z$.

At block 314, the client device 170 generates (e.g., by a GPU 180 of the client device 170) parallel inputs based on the processing model. Block 314 may be similar to block 204 of FIG. 2.

At block 316, the client device 170 concurrently processes, by cores of one or more GPUs 180, the parallel inputs to generate parallel outputs for the batch of semiconductor substrates. Block 316 may be similar to block 206 of FIG. 2.

At block 318, the client device 170 generates (e.g., by a processing device of the client device 170) a timetable (e.g., schedule) for the batch of substrates based on the parallel outputs generated at block 316. For example, the timetable includes the start time $T_x$ of each substrate, and the order of substrate processing at each processing chamber.

In some embodiments, at block 320, the client device 170 predicts (e.g., by a processing device of the client device 170) throughput based on the timetable (e.g., performs throughput modeling). For example, the client device 170 may predict the number of substrates a tool (e.g., cluster tool 100 of FIG. 1) can process in a set amount of time (e.g., in an hour) based on the timetable. At block 320, the client device 170 (e.g., and the GPU) may not be connected to a cluster tool (e.g., cluster tool 100), but may be used as a mathematical model solver for predicting throughput. In some embodiments, the client device 170 generates a predicted throughput and transmits the predicted throughput to another device. In some embodiments, the client device 170 generates a predicted throughput and displays the predicted throughput via a graphical user interface (GUI) of the client device 170 to a user.

At block 322, the client device 170 (e.g., by a processing device of the client device 170) determines whether there are any updates. The updates may be received via user input via a GUI of the client device 170. The updates may be modifications to (or newly received) one or more of at least one constraint of the processing model, the list of substrates, at least one processing sequence, or at least one assigned processing chamber. For example, responsive to displaying or transmitting (causing to be displayed) the predicted throughput, the client device 170 may receive one or more updates (e.g., to a constraint, list, processing sequence, processing chamber, processing model, etc.) to determine the effects of the updates on the predicted throughput (e.g., to change the predicted throughput). If there are updates, flow proceeds to block 324. If, however, at block 322, the client device 170 determines that there are no updates, then flow ends.

At block 324, the client device 170 (e.g., by processing device of the client device 170) updates the processing model to generate an updated processing model (based on the updates) and flow continues to block 314. Flow from block 314 to block 324 may continue until a desired predicted throughput is achieved.

Through predicting throughput, client device 170 may evaluate any new equipment architecture at early stages to determine what the throughput will be and the best of many alternatives may be chosen for investment and further development. For existing tools, the client device 170 may perform modeling to predict throughput to quantify the effects of any changes on the throughput. The change may be in substrate processing acts, in tool topology, or in any of the process constraints. The client device 170 predicting throughput may provide accurate throughput estimates to customers. The client device 170 predicting throughout may be used to simulate how the real tool will react when a fault or an unforeseen event happens. The results of such simulations may be available within a few minutes, so it saves items in testing and development.

In some embodiments, responsive to predicting throughput (e.g., and updating the processing model), the client device causes (e.g., by a processing device of the client device 170) the batch of semiconductor substrates to be processed based on the timetable. For example, client device 170 may transmit (e.g., by the processing device of the client device 170) the timetable to the controller 160 and cause controller 160 to begin substrate processing (e.g., to control cluster tool 100 to begin substrate processing) based on the timetable. In those embodiment in which the client device 170 and the controller are one in the same, client device 170 may not transmit the timetable.

FIG. 4 is a flow diagram of a method 400 for processing parallel inputs by one or more GPUs, according to certain embodiments.

Referring to FIG. 4, at block 402 client device 170 generates (e.g., by a processing device of the client device 170) a processing model for a batch of semiconductor substrates. Block 402 may be similar to one or more of block 202 of FIG. 2 or blocks 302-312 of FIG. 3.

At block 404, client device 170 receives, by a first GPU 180A including first cores, the processing model. The client device 170 may include a cluster of GPUs 180 (e.g., two or more GPUs). In some embodiments, the first GPU 180A is a master GPU (e.g., a master node) of the cluster of GPUs 180.

At block 406, client device 170 generates, by the first GPU 180A, parallel inputs based on the processing model. Block 406 may be similar to block 204 of FIG. 2.

At block 408, client device 170 determines, by the first GPU 180A, whether the first amount of parallel inputs are greater than a second amount of first cores of the first GPU 180A. If the first amount of parallel inputs is not greater than the second amount of first cores (e.g., the first amount of 500 parallel inputs is not greater than the second amount 786 first cores), flow proceeds to block 410. If, however, at block 408, the client device 170 (e.g., first GPU 180A) determines that the first amount of parallel inputs is greater than the second amount of first cores (e.g., the first amount of 1,000 parallel inputs is greater than the second amount 786 first cores), then flow proceeds to block 412.

At block 410, client device 170, concurrently processes, by the first cores of the first GPU 180A, the parallel inputs to generate parallel outputs for the batch of semiconductor substrates. Block 410 may be similar to block 206 of FIG. 2.

At block 412, client device 170, by the first GPU 180A, assigns a first subset of the parallel inputs to first cores of the first GPU 180A and a second subset of the parallel inputs to a second cores of a second GPU 180B. In some embodiments, the first GPU 180A assigns substantially half of the parallel inputs to the first cores of the first GPU 180A and substantially half of the parallel inputs to the second cores of the second GPU 180B. In some embodiments, the first GPU 180A assigns parallel inputs to three or more GPUs 180.

At block 414, client device 170 concurrently processes the first subset by the first cores of the first GPU 180A and the second subset by the second cores of the second GPU 180B to generate parallel outputs for the batch of semiconductor substrates. Block 414 may be similar to block 206 of FIG. 2.

At block 414, client device 170 generates a timetable based on the parallel outputs. Block 414 may be similar to block 318 of FIG. 3.

At block 416, client device 170 optionally predicts throughput based on the timetable. Block 416 may be similar to block 320 of FIG. 3. Responsive to receiving updates (e.g., to the processing model, a constraint, a processing sequence, a processing chamber, etc.), the processing model may be updated and flow may continue to block 402.

At block 418, client device 170 causes the batch of semiconductor substrates to be processed based on the timetable. Block 418 may be similar to block 322 of FIG. 3 or block 208 of FIG. 2.

At block 420, client device 170 determines (e.g., by processing device of client device 170) whether a fault has occurred (e.g., in the integrated substrate processing system). If client device 170 determines that a fault has occurred, flow continues to block 402 where the client device generates an updated processing model based on the fault. If, however, at block 420, the client device 170 determines that a fault has not occurred (e.g., and the substrate processing has ended), method 400 may end.

Figure 5:
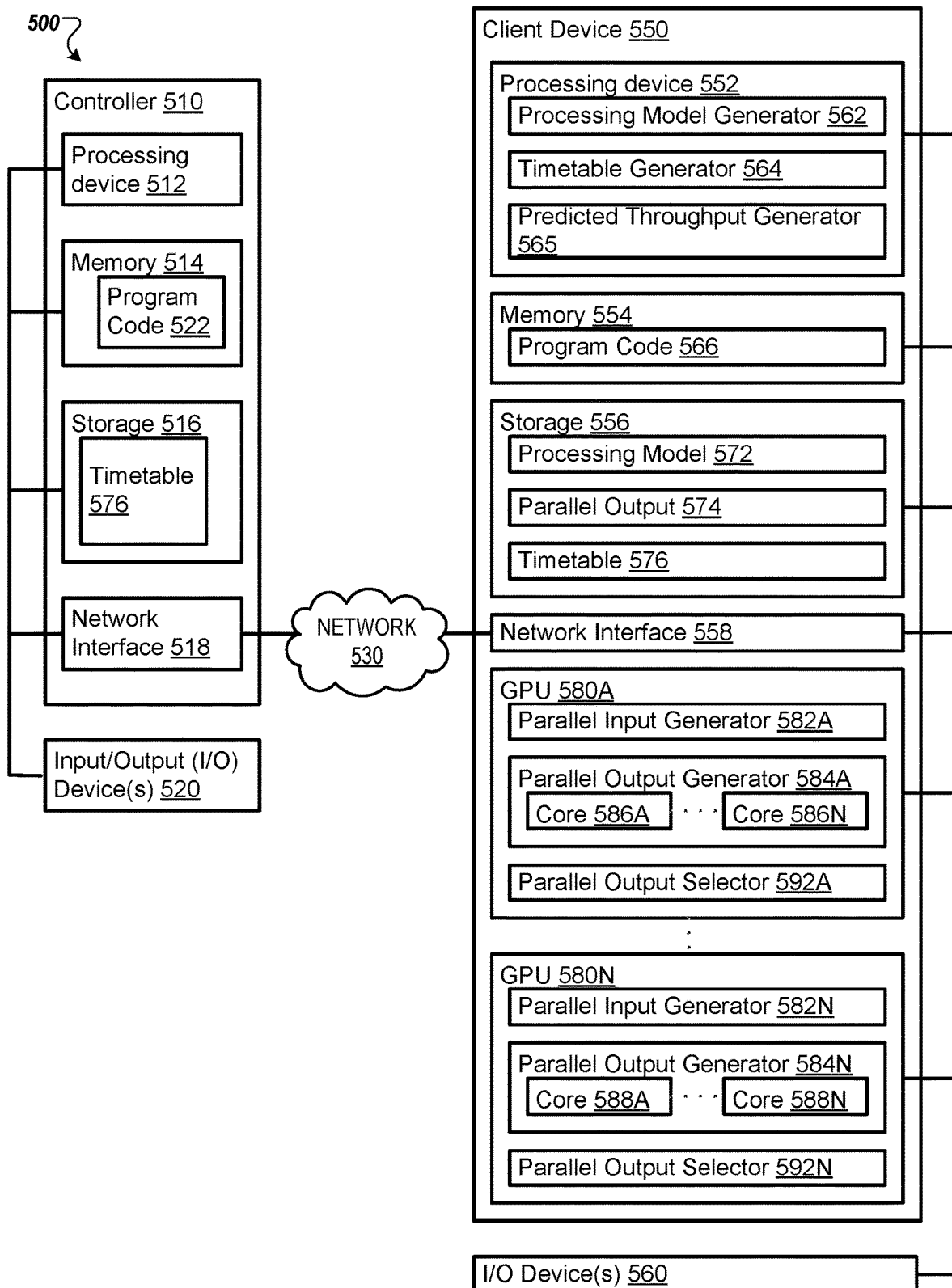
FIG. 5 illustrates a computing platform, according to certain embodiments.

FIG. 5 illustrates a computing platform 500, according to certain embodiments. Computing platform 500 includes controller 510 (e.g., controller 160) and client device 550 (e.g., client device 170). Controller 510 includes a processing device 512, a memory 514, storage 516, and network interface 518. In some embodiments, the controller 510 may further include one or more input/output (I/O) devices 520 coupled thereto. The processing device 512 retrieves and executes programming instructions, such as program code 522, stored in memory 514. The processing device 512 is included to be representative of a single processing device, multiple processing devices, a single processing device having multiple processing cores, a processor, a central processing unit (CPU), and the like.

The storage 516 may be a disk drive storage. Although shown as a single unit, the storage 516 may be a combination of fixed and/or removable storage devices, such as fixed disk drives, removable memory cards, optical storage, network attached storage (NAS), or storage-area-network (SAN). The network interface 518 may be any type of network communications allowing the controller 510 to communicate with other computers via network 530 (e.g., network 190), such as, for example, with client device 550.

The client device 550 includes a processing device 552, a memory 554, storage 556, and network interface 558. In some embodiments, the client device 550 may further include one or more I/O devices 560 coupled thereto. The processing device 552 is included to be representative of a single processing device, multiple processing devices, a single processing device having multiple processing cores, a processor, a CPU, and the like. The client device 550 may further include one or more GPUs 580 (e.g., GPUs 180).

The processing device 552 may include a processing model generator 562, a timetable generator 564, and a predicted throughput generator 565. The processing model generator 562 may be configured to assign a processing chamber to each substrate for each act in the processing sequence, and, subsequently, generate a processing model 572 based on the processing chamber assignment. For example, processing model generator 562 may be configured to carry out the processes of one or more blocks discussed above in conjunction with FIGS. 2-4. The generated processing model may be stored in storage 556. For example, processing model 572 may be in storage 556. The timetable generator 564 is configured to generate a processing timetable based on a parallel output 574. For example, the timetable generator 564 may be configured to carry out the processes discussed above in accordance with block 318 of FIG. 3 or block 416 of FIG. 4. The generated timetables may be stored in storage 556. For example, timetable 576 may be in storage 556. The predicted throughput generator 565 is configured to predict throughput based on the timetable. For example, the predicted throughput generator 565 may be configured to carry out the processes discussed above in accordance with block 320 of FIG. 3 or block 418 of FIG. 4.

The memory 554 includes program code 566. One or more of the processing device 552 or the one or more GPUs 580 may retrieve and execute programming instructions, such as program code 566, stored in memory 554. The program code 566 may be configured to carry out the instructions of causing a batch of substrates to be processed (e.g., based on a processing schedule, based on a timetable, based on parallel outputs, etc.). For example, the program code 566 may include one or more blocks discussed above in conjunction with FIGS. 2-4.

The one or more GPUs 580 may include cores 586, 588 (e.g., GPU 580A includes cores 586A-N and GPU 580N includes cores 588A-N. One or more of the GPUs 580 may include one or more of a parallel input generator 582, a parallel output generator 584, or a parallel output selector 592. The parallel output generator 584 may include the cores 586 or 588.

In some embodiments, the GPU 580A receives the processing model 572 and outputs a parallel output 574 (e.g., GPU 580A includes parallel input generator 582A and a parallel output selector 592A). In some embodiments, the one or more GPUs 580 receive the parallel inputs and output parallel outputs (e.g., the processing device 552 includes parallel input generator 582A and a parallel output selector 592A).

In one example, the processing model generator 562 may generate a processing model 572 for a batch of semiconductor substrates (e.g., block 202 of FIG. 2, blocks 302-312 of FIG. 3, block 402 of FIG. 4, etc.). The parallel input generator 582A may receive the processing model 572 and may generate parallel inputs based on the processing model 572 (e.g., block 204 of FIG. 2, block 314 of FIG. 3, blocks 404-406 of FIG. 4, etc.).

Responsive to the parallel input generator 582A determining that a first amount of parallel inputs does not exceed the second amount of first cores 586 of the GPU 580A, the parallel input generator 582A transmits the parallel inputs to the parallel output generator 584A (e.g., the parallel input generator 582A distributes each of the parallel inputs to distinct cores 586 of the parallel output generator 584A).

Responsive to the parallel input generator 582A determining that a first amount of parallel inputs exceeds the second amount of first cores 586 of the GPU 580A, the parallel input generator 582A transmits the parallel inputs to two or more parallel output generators 584 (e.g., the parallel input generator 582A distributes the parallel inputs to distinct cores 586, 588 of two or more parallel output generators 584).

Responsive to the parallel input generator 582A determining that the first amount of parallel inputs exceeds a third amount of total cores of the GPUs 580 of the client device 550, the parallel input generator 582A may distribute a first set of parallel inputs to the cores of the GPUs to be concurrently processed. For each of the cores, once a core is available (e.g., has completed processing a corresponding parallel input), the parallel input generator 582A may distribute another parallel input to the available core. The parallel input generator 582A may continue distributing parallel inputs to available cores until all of the parallel inputs have been processed.

The parallel output selector 592 (e.g., parallel output selector 592A of GPU 580A) may compare the parallel outputs to select a parallel output 574 that provides a minimum processing duration (e.g., as compared to all of the parallel outputs). In some embodiments, the parallel output selector 592 is located in GPU 580A. In some embodiments, the parallel output selector 592 is located in each of the GPUs 580. In some embodiments, the parallel output selector 592 is located in the processing device 552.

The timetable generator 564 may receive the parallel output 574 (e.g., selected by parallel output selector 592) and may generate a timetable 576 based on the parallel output 574. The network interface 558 may receive the timetable 576 and transmit the timetable 576 to network interface 518 of the controller 510 via network 530 to cause the batch of semiconductor substrates to be processed in the substrate processing system based on the timetable 576.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of program product define functions of the embodiments (including the methods described herein) and can be contained on a variety of computer-readable storage media. illustrative computer-readable storage media include, but are not limited to: (i)

non-writable storage media (for example, read-only memory devices within a computer such as CD-ROM disks readable by CD-ROM drive, flash memory, ROM chips, or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings and included within the true spirit and scope of the present disclosure. It is therefore intended that the following appended claims include all such modifications, permutations, and equivalents as fall within the true spirit and scope of these teachings.

While the foregoing is directed to embodiments of the present disclosure, other and further embodiments of the disclosure may be devised without departing from the basic scope thereof, and the scope thereof is determined by the claims that follow.

What is claimed is:

1. A method of scheduling a semiconductor substrate processing sequence in an integrated substrate processing system, the method comprising:
    generating a processing model for a batch of semiconductor substrates, wherein the processing model comprises a matrix and defines a corresponding start time for each semiconductor substrate in each processing chamber in the integrated substrate processing system;
    generating parallel inputs based on the processing model, wherein the generating of the parallel inputs comprises generating, by a first graphics processing unit (GPU) of one or more GPUs, a plurality of matrices based on the matrix;
    concurrently processing, by a plurality of cores of the one or more GPUs, the parallel inputs to generate parallel outputs for the batch of semiconductor substrates, wherein each of the parallel inputs is processed on a distinct core of the plurality of cores of the one or more GPUs to generate a corresponding parallel output; and
    causing the batch of semiconductor substrates to be processed in the integrated substrate processing system based on the parallel outputs.

2. The method of claim 1 further comprising receiving, by the first GPU, the processing model, wherein the parallel outputs correspond to a set of values for processing of the batch of semiconductor substrates.

3. The method of claim 2, wherein generating of the parallel outputs comprises:
    solving each of the plurality of matrices to generate, for each of the plurality of matrices, a corresponding set of values of a plurality of sets of values, wherein each of the plurality of sets of values corresponds to a respective processing duration for processing of the batch of semiconductor substrates; and
    selecting the set of values of the plurality of sets of values that corresponds to a minimum processing duration for the processing of the batch of semiconductor substrates.

4. The method of claim 1 further comprising predicting throughput of the integrated substrate processing system based on the parallel outputs.

5. The method of claim 1 further comprising:
    detecting a fault in the integrated substrate processing system;
    generating an updated processing model based on the fault;
    generating updated parallel inputs based on the updated processing model;
    processing, by the one or more GPUs, the updated parallel inputs to generate updated parallel outputs for the batch of semiconductor substrates; and
    causing the batch of semiconductor substrates to be processed in the integrated substrate processing system based on the updated parallel outputs.

6. The method of claim 5, wherein:
    the causing of the batch of semiconductor substrates to be processed based on the parallel outputs comprises routing the batch of semiconductor substrates in the integrated substrate processing system based on the parallel outputs; and
    the causing of the batch of semiconductor substrates to be processed based on the updated parallel outputs comprises re-routing of one or more semiconductor substrates in the integrated substrate processing system based on the updated parallel outputs.

7. The method of claim 1, wherein the one or more GPUs comprises a first GPU and a second GPU, the method further comprising:
    receiving, by the first GPU, the processing model, wherein the generating of the parallel inputs is by the first GPU;
    determining, by the first GPU, that a first quantity of the parallel inputs exceeds a second quantity of a first plurality of cores of the first GPU; and
    assigning a first subset of the parallel inputs to the first GPU and a second subset of the parallel inputs to the second GPU, wherein the first GPU is to process the first subset and the second GPU is to process the second subset.

8. The method of claim 1 further comprising:
    generating, based on the batch of semiconductor substrates, a list of semiconductor substrates to be processed;
    assigning a corresponding processing sequence to each semiconductor substrate corresponding to the list of semiconductor substrates; and
    for each semiconductor substrate in the list of semiconductor substrates, assigning a corresponding processing chamber to each process in the corresponding processing sequence, wherein the processing model is generated based on the list of semiconductor substrates, the corresponding processing sequence for each semiconductor substrate of the list of semiconductor substrates, and the corresponding processing chamber for each process in the corresponding processing sequence for each semiconductor substrate of the list of semiconductor substrates.

9. The method of claim 1 further comprising generating a timetable for the batch of semiconductor substrates based on the parallel outputs, wherein the causing of the batch of semiconductor substrates to be processed based on the parallel outputs comprises causing the batch of semiconductor substrates to be processed in accordance with the timetable.

10. A system comprising:
a memory; and
a processor, coupled to the memory, to generate a processing model for a batch of semiconductor substrates, wherein the processing model comprises a matrix and defines a corresponding start time for each semiconductor substrate in each processing chamber in an integrated substrate processing system; and
a graphics processing unit (GPU), coupled to the memory and the processor, to generate parallel inputs based on the processing model and concurrently process, by a plurality of cores of the GPU, the parallel inputs to generate parallel outputs for the batch of semiconductor substrates, wherein to generate the parallel inputs, the GPU is to generate a plurality of matrices based on the matrix, wherein each of the parallel inputs is processed on a distinct core of the plurality of cores of the GPU to generate a corresponding parallel output, wherein the processor is to cause the batch of semiconductor substrates to be processed in the integrated substrate processing system based on the parallel outputs.

11. The system of claim 10, wherein the GPU is further to receive the processing model, and wherein the parallel outputs correspond to a set of values for processing of the batch of semiconductor substrates.

12. The system of claim 11, wherein to generate the parallel outputs, the GPU is to:
solve each of the plurality of matrices to generate, for each of the plurality of matrices, a corresponding set of values of a plurality of sets of values, wherein each of the plurality of sets of values corresponds to a respective processing duration for processing of the batch of semiconductor substrates; and
select the set of values of the plurality of sets of values that corresponds to a minimum processing duration for the processing of the batch of semiconductor substrates.

13. The system of claim 11, wherein the processor is further to predict throughput of the integrated substrate processing system based on the parallel outputs.

14. The system of claim 10, wherein the processor is to detect a fault in the integrated substrate processing system and generate an updated processing model based on the fault, wherein the GPU is to generate updated parallel inputs based on the updated processing model and process the updated parallel inputs to generate updated parallel outputs for the batch of semiconductor substrates, wherein the processor is to cause the batch of semiconductor substrates to be processed in the integrated substrate processing system based on the updated parallel outputs.

15. The system of claim 14, wherein to cause the batch of semiconductor substrates to be processed based on the parallel outputs, the processor is to route the batch of semiconductor substrates in the integrated substrate processing system based on the parallel outputs, and wherein to cause the batch of semiconductor substrates to be processed based on the updated parallel outputs, the processor is to re-route one or more semiconductor substrates in the integrated substrate processing system based on the updated parallel outputs.

16. The system of claim 10, wherein the processor is further to:
generate, based on the batch of semiconductor substrates, a list of semiconductor substrates to be processed;
assign a corresponding processing sequence to each semiconductor substrate corresponding to the list of semiconductor substrates; and
for each semiconductor substrate in the list of semiconductor substrates, assign a corresponding processing chamber to each process in the corresponding processing sequence, wherein the processing model is generated based on the list of semiconductor substrates, the corresponding processing sequence for each semiconductor substrate of the list of semiconductor substrates, and the corresponding processing chamber for each process in the corresponding processing sequence for each semiconductor substrate of the list of semiconductor substrates.

17. A non-transitory computer readable medium having instructions stored thereon, which, when executed by a graphics processing unit (GPU), cause the GPU to:
receive a processing model for a batch of semiconductor substrates, wherein the processing model comprises a matrix and defines a corresponding start time for each semiconductor substrate in each processing chamber in an integrated substrate processing system;
generate parallel inputs based on the processing model, wherein to generate the parallel inputs, the GPU is to generate a plurality of matrices based on the matrix; and
concurrently process, by a plurality of cores of the GPU, the parallel inputs to generate parallel outputs for the batch of semiconductor substrates, wherein each of the parallel inputs is processed on a distinct core of the plurality of cores of the GPU to generate a corresponding parallel output, wherein the batch of semiconductor substrates are to be processed in the integrated substrate processing system based on the parallel outputs.

18. The non-transitory computer readable medium of claim 17, wherein the parallel outputs correspond to a set of values for processing of the batch of semiconductor substrates.

19. The non-transitory computer readable medium of claim 18, wherein to generate the parallel outputs, the GPU is to:
solve each of the plurality of matrices to generate, for each of the plurality of matrices, a corresponding set of values of a plurality of sets of values, wherein each of the plurality of sets of values corresponds to a respective processing duration for processing of the batch of semiconductor substrates; and
select the set of values of the plurality of sets of values that corresponds to a minimum processing duration for the processing of the batch of semiconductor substrates.

20. The non-transitory computer readable medium of claim 18, wherein throughput of the integrated substrate processing system is to be predicted based on the parallel outputs.

* * * * *